(12) United States Patent
Powell et al.

(10) Patent No.: US 7,614,210 B2
(45) Date of Patent: Nov. 10, 2009

(54) DOUBLE BYPASS TURBOFAN

(75) Inventors: Brandon Flowers Powell, Mason, OH (US); John Jared Decker, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 769 days.

(21) Appl. No.: 11/352,673

(22) Filed: Feb. 13, 2006

(65) Prior Publication Data

US 2007/0186535 A1    Aug. 16, 2007

(51) Int. Cl.
*F02K 3/02*    (2006.01)
(52) U.S. Cl. .................. 60/226.3; 60/226.1; 60/262
(58) Field of Classification Search ............ 60/268, 60/39.162, 226.1, 262, 263
See application file for complete search history.

(56) References Cited

U.S. PATENT DOCUMENTS

| | | | |
|---|---|---|---|
| 2,846,843 A | 8/1958 | Clark et al. | |
| 3,296,800 A | 1/1967 | Keenan et al. | |
| 3,382,670 A | 5/1968 | Venable | |
| 3,677,012 A | 7/1972 | Batscha | |
| 3,721,389 A * | 3/1973 | MacKinnon et al. | ... 239/265.19 |
| 3,729,957 A | 5/1973 | Petrie et al. | |
| 3,830,056 A | 8/1974 | Willis et al. | |
| 3,841,091 A * | 10/1974 | Sargisson et al. | ............. 60/224 |
| 3,867,813 A * | 2/1975 | Leibach | ......... 60/225 |
| 3,886,737 A * | 6/1975 | Grieb | ......... 60/226.1 |
| 3,938,328 A | 2/1976 | Klees | |
| 4,039,146 A * | 8/1977 | Wagenknecht | ......... 239/265.25 |
| 4,043,121 A * | 8/1977 | Thomas et al. | ............. 60/204 |
| 4,050,242 A * | 9/1977 | Dusa | ............. 60/204 |
| 4,052,847 A | 10/1977 | Rodgers et al. | |
| 4,054,030 A | 10/1977 | Pedersen | |
| 4,055,042 A | 10/1977 | Colley | |
| 4,060,981 A | 12/1977 | Hampton | |
| 4,064,692 A * | 12/1977 | Johnson et al. | ............. 60/762 |
| 4,068,471 A | 1/1978 | Simmons | |
| 4,069,661 A | 1/1978 | Rundell et al. | |
| 4,072,008 A | 2/1978 | Kenworth et al. | |
| 4,080,785 A | 3/1978 | Koff et al. | |
| 4,175,384 A * | 11/1979 | Wagenknecht et al. | ..... 60/226.3 |
| 4,176,792 A | 12/1979 | McCardle, Jr. | |
| 4,222,233 A * | 9/1980 | Johnson et al. | ............... 60/225 |

(Continued)

FOREIGN PATENT DOCUMENTS

EP    1510682 A2    3/2005

(Continued)

OTHER PUBLICATIONS

U.S. Appl. No. 11/169,377, filed Jun. 29, 2005; by B. Powell et al.

*Primary Examiner*—William H Rodríguez
(74) *Attorney, Agent, or Firm*—William S. Andes; Francis L. Conte

(57) ABSTRACT

A variable cycle turbofan engine includes first and second fans independently joined to respective turbines. A first bypass duct surrounds a core engine disposed in flow communication with the second fan. A second bypass duct surrounds the first bypass duct in flow communication with the first fan. A first exhaust nozzle is joined to both the core engine and first bypass duct. And, a second exhaust nozzle is joined to the second bypass duct.

22 Claims, 2 Drawing Sheets

U.S. PATENT DOCUMENTS

| | | | |
|---|---|---|---|
| 4,958,489 A | | 9/1990 | Simmons |
| 5,010,729 A | * | 4/1991 | Adamson et al. ............ 60/226.1 |
| 5,261,227 A | * | 11/1993 | Giffin, III .................. 60/226.1 |
| 5,274,999 A | * | 1/1994 | Rohra et al. ................ 60/226.1 |
| 5,349,814 A | | 9/1994 | Ciokajlo et al. |
| 5,402,638 A | | 4/1995 | Johnson |
| 5,404,713 A | * | 4/1995 | Johnson ........................ 60/204 |
| 5,806,303 A | | 9/1998 | Johnson |
| 5,809,772 A | * | 9/1998 | Giffin, III et al. ........... 60/226.1 |
| 6,901,739 B2 | * | 6/2005 | Christopherson ........... 60/226.3 |
| 6,981,841 B2 | | 1/2006 | Krammer et al. |
| 7,246,484 B2 | * | 7/2007 | Giffin, III et al. ............. 60/268 |
| 7,395,657 B2 | * | 7/2008 | Johnson ...................... 60/226.1 |

FOREIGN PATENT DOCUMENTS

| | | |
|---|---|---|
| GB | 1436796 A | 5/1976 |

\* cited by examiner

DOUBLE BYPASS TURBOFAN

BACKGROUND OF THE INVENTION

The present invention relates generally to gas turbine engines, and, more specifically, to a variable cycle engine for powering an aircraft at supersonic velocity in flight.

The common aircraft turbofan gas turbine engine includes a single stage fan driven by a low pressure turbine (LPT). A multistage axial compressor follows the fan for further pressurizing air which is mixed with fuel in a combustor for generating hot combustion gases. Energy is extracted from the combustion gases in a high pressure turbine (HPT) that powers the compressor.

The fan and compressor are joined by independent drive shafts or spools to the corresponding rotors of the LPT and the HPT. In this way, the operating lines of the fan and compressor may be independently controlled during the various portions of the flight envelope including takeoff, climb, cruise, approach, and landing on the runway.

Turbofan engines are arranged in two distinct configurations. One configuration includes a short duct or nacelle surrounding the fan in a high bypass configuration having separate fan and core engine exhaust nozzles for separately discharging the air pressurized by the fan and the combustion gases generated in the core engine.

A second configuration of the turbofan engine includes a long duct or nacelle surrounding the fan and extending to the aft end of the engine in a common exhaust nozzle which discharges both the pressurized fan air and the combustion exhaust gases.

In both configurations, either a short or long bypass duct surrounds the core engine for bypassing or diverting a portion of the pressurized fan air around the core engine, including the high pressure compressor therein which has limited flow capability.

In the short nacelle configuration, the fan bypass duct is correspondingly short and terminates in an independent fan nozzle.

In the long duct configuration, the bypass duct extends from the fan to downstream of the LPT and typically rejoins the bypass air with the combustion exhaust flow prior to discharge in the common exhaust nozzle.

The common turbofan aircraft engine and its two independent rotors is typically configured for powering an aircraft at subsonic velocities well below Mach 1.

However, for supersonic military or commercial aircraft, the size, weight, and complexity of the turbofan engine increase substantially for producing the increased amount of propulsion thrust required for accelerating the aircraft to supersonic velocity greater than Mach 1, and maintaining that supersonic velocity during prolonged cruise operation. The supersonic business jet (SSBJ) is being designed for sustained supersonic cruise operation, yet requires commercially viable efficiency of the engine, and regulatory acceptable levels of exhaust noise.

Noise generation in a supersonic aircraft is a significant design problem for meeting various governmental noise regulations, typically most severe in the immediate vicinity of an airport.

Accordingly, the prior art is replete with various configurations of variable cycle turbofan engines specifically configured for powering aircraft at supersonic velocity. The size, weight, and complexity of these various variable cycle turbofan engines vary dramatically, along with the aerodynamic efficiency thereof and the level of noise generated during operation. Substantial compromises in the design of the various components of the supersonic aircraft engine must be made in an attempt to balance the competing design objectives for obtaining high performance.

One form of variable cycle engine includes a FLADE, which is an acronym for "fan on blade." The FLADE is a special form of fan that includes relatively large fan blades having a radially outer tip extension defined by a part-span integral shroud. The FLADE airfoil, or outer portion of the fan blade above the shroud is specifically configured in aerodynamic profile for efficiently pressurizing tip air which flows downstream through a corresponding annular bypass duct surrounding the core engine. This FLADE bypass air may then be used in various forms of specialized exhaust nozzles for reducing acoustic noise during desired portions of the flight envelope.

A substantial problem in incorporating FLADEs in turbofan engines is the additional centrifugal force generated thereby during operation which must be accommodated by the inner airfoil and supporting rotor disk. The outer FLADE airfoil and its integral inner shroud create large centrifugal loads during rotary operation of the fan, and therefore require a thicker inner airfoil and larger supporting rotor disk for carrying the centrifugal loads within suitable stress limits for ensuring long life of the fan.

The thicker fan airfoil in turn decreases aerodynamic efficiency and performance of the airfoil, which correspondingly reduces overall efficiency of the engine.

The FLADE may therefore be used to provide pressurized air for acoustic nozzles, which allows for a higher fan pressure ratio in the turbofan engine at noise levels equivalent to larger, lower fan pressure ratio engine cycles. In subsonic cruise configurations, a FLADED mixed flow turbofan engine can show a performance improvement relative to a FLADED variable cycle engine, but only marginally better performance relative to the conventional mixed flow turbofan engine.

The FLADED engine may enjoy the benefit of increased thrust per unit airflow at the considerable expense of the increase in centrifugal loads from the FLADE airfoils, and corresponding increase in weight of the engine for the accommodation thereof, as well as aerodynamic performance penalties due to the thicker supporting fan airfoil below the FLADE.

Furthermore, the introduction of the FLADE in a turbofan engine typically includes inlet guide vanes (IGVs) before the FLADED fan stage, as well as outlet guide vanes (OGVs) following the FLADED stage. These guide vanes are used to increase aerodynamic efficiency, but require a corresponding increase in length of the engine, and corresponding increase in weight and complexity.

The dilemma then facing the engine designer in configuring a practical supersonic aircraft engine is the delicate balance between aerodynamic configuration, mechanical strength, exhaust noise, size, weight, and complexity of the various components of the turbofan engine which are typically mutually interrelated.

Accordingly, it is desired to provide a supersonic aircraft turbofan engine having improved performance and efficiency and noise attenuation.

BRIEF DESCRIPTION OF THE INVENTION

A variable cycle turbofan engine includes first and second fans independently joined to respective turbines. A first bypass duct surrounds a core engine disposed in flow communication with the second fan. A second bypass duct surrounds the first bypass duct in flow communication with the first fan. A first exhaust nozzle is joined to both the core engine and first bypass duct. And, a second exhaust nozzle is joined to the second bypass duct.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
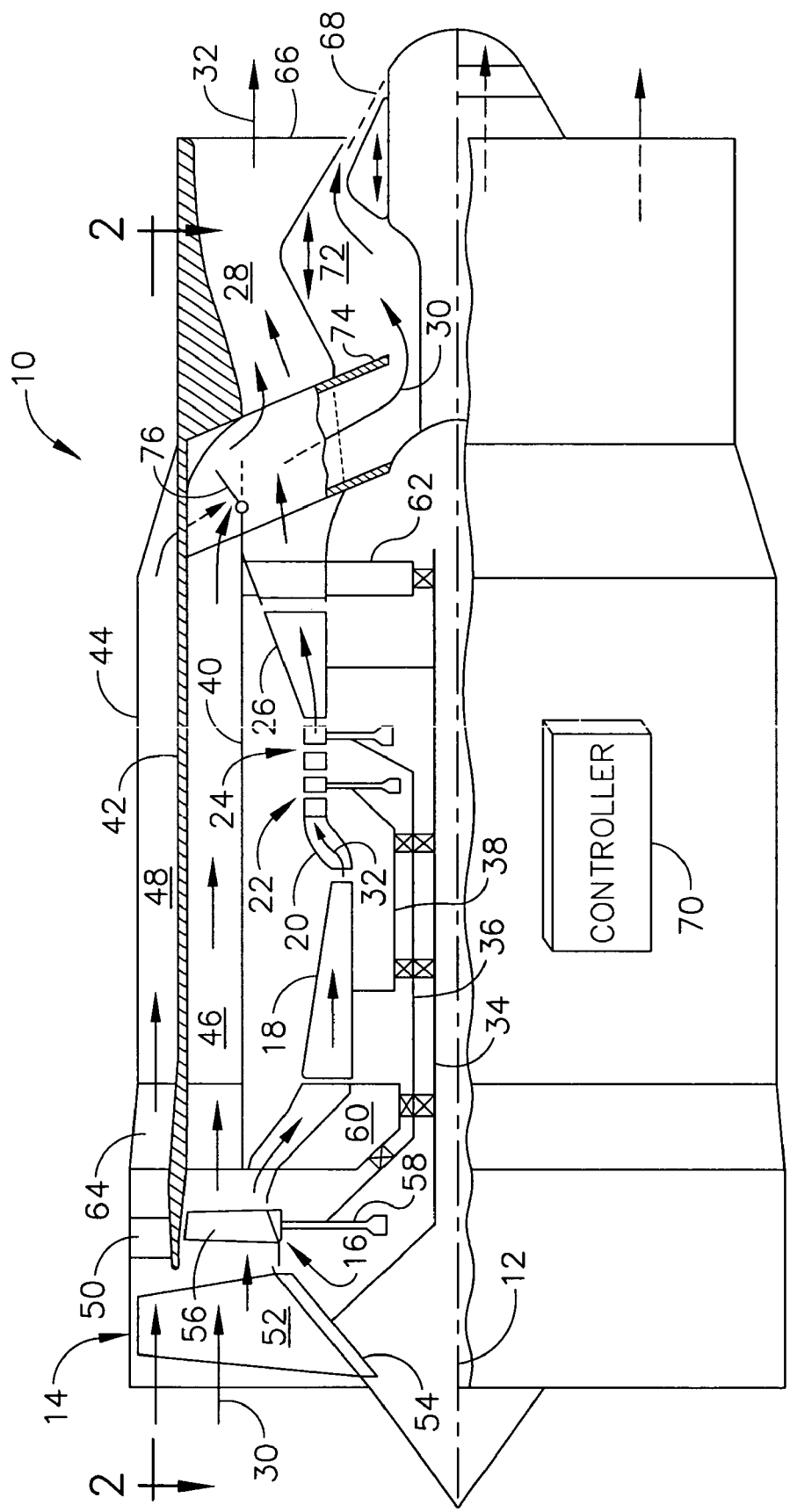
FIG. 1 is an axial schematic view of a supersonic, variable cycle turbofan aircraft engine.

Illustrated schematically in FIG. 1 is a variable cycle turbofan gas turbine engine 10 configured for powering an aircraft (not shown) in flight from subsonic to supersonic flight speeds exceeding Mach 1. The turbofan engine 10 is axisymmetrical about a longitudinal or axial centerline axis 12 and may be suitably mounted to the wing or fuselage of the aircraft as desired.

The engine 10 includes a first fan 14, a second fan 16, a high pressure compressor 18, a combustor 20, a first or high pressure turbine (HPT) 22, a second or intermediate pressure turbine (IPT) 24, a third or low pressure turbine (LPT) 26, and an exhaust duct 28 disposed in serial flow communication coaxially along the centerline axis 12.

Ambient air 30 enters the engine through its intake and is pressurized in turn by the fans and compressor and mixed with fuel in the combustor 20 for generating hot combustion gases 32. Energy is extracted from the combustion gases in the three turbines for powering the fans and compressor, with the combustion gases being discharged through the exhaust duct 28.

The first fan 14 is joined to the third turbine 26 by a first spool or drive shaft 34. The second fan 16 is joined to the second turbine 24 by a second spool or drive shaft 36. And, the compressor 18 is joined to the first turbine 22 by a third spool or drive shaft 38, with the three drive shafts being coaxial and concentric with each other.

An annular first casing 40 surrounds the core engine, which includes the compressor 18, combustor 20, and HPT 22, and extends aft past the second and third turbines 24,26. An annular second casing 42 is spaced radially outwardly or outboard from the first casing 40 concentric therewith. And, an annular third casing 44 is spaced radially outboard from the second casing 42 and concentric therewith.

The first and second casings 40,42 define radially therebetween an annular inner or first bypass duct 46 which coaxially surrounds the core engine, including the compressor 18 in flow communication with the second fan 16, for receiving a portion of the pressurized air 30 therefrom. The first bypass duct 46 extends axially in length from its forward inlet end behind the second fan 16, around the core engine, and terminates at its aft end in the common exhaust duct 28 for the core engine, and therefore bypasses the core engine.

The second and third casings 42,44 define radially therebetween an annular outer or second bypass duct 48 which coaxially surrounds the second fan 16 and the inner bypass duct 46 in flow communication with the radially outer tip of the first fan 14. The outer bypass duct 48 extends axially in length from its inlet end directly behind the first fan 14 to its outlet end disposed axially aft of the core engine and third turbine 26 at the aft end of the inner bypass duct 46.

The two bypass ducts 46,48 are concentric with each other and extend from the upstream fans in a long duct configuration over the majority of the axial length of the engine to bypass the inner core engine with two concentric streams of airflow from the two fans.

In particular, the first fan 14 is large in diameter and extends radially outwardly across the radial span of the small diameter second fan 16 and the first bypass duct 46 disposed directly therebehind, and additionally extends radially outwardly over the radial span of the inlet end of the second bypass duct 48 to terminate in a small radial spacing or gap just below the inner surface of the third casing 44 surrounding the first fan.

Correspondingly, the small diameter second fan 16 extends radially outwardly across both the inlet end of the core engine leading to the compressor 18 and the inlet end of the first, bypass duct 46 to terminate in a small clearance or gap inside the inlet end of the surrounding second casing 48.

A row of fixed outlet guide vanes (OGVs) 50 is disposed coaxially in the inlet end of the second bypass duct 48 radially outboard of the second fan 16 in general axial alignment therewith. The OGVs 50 have suitable airfoil configurations for deswirling the pressurized air 30 discharged from the radially outer tip portion of the first fan 14.

The first fan 14 includes only single stage or row of large first fan rotor blades 52 extending radially outwardly from a supporting first rotor disk 54. The second fan 16 is preferably a single stage or row of small second fan rotor blades 56 extending radially outwardly from a supporting second rotor disk 58, and is disposed axially between the first fan blades 52 and the first bypass duct 46.

The first disk 54 is fixedly joined to the first shaft 34, and the second disk 58 is fixedly joined to the second shaft 36. In this way, the large single stage first fan 14 is directly followed in flow communication by the small single stage second fan 16 and independently joined to and driven by the respective third and second turbines 26,24.

The first fan blades 52 have suitable airfoil configurations with generally concave pressure sides and generally convex opposite suction sides being relatively smooth from root to tip of each blade, and are characterized by the lack of any integral tip or mid-span shrouds. In this way, the first fan blades may be relatively thin for maximizing aerodynamic performance of the fan stage, while reducing centrifugal loads which must be carried by the supporting rotor disk 54.

Correspondingly, the smaller second fan blades 56 are also suitably configured with generally concave pressure sides and generally convex, opposite suction sides extending smoothly from root to tip. The second fan blades 56 are suitably configured in airfoil profile for maximizing aerodynamic efficiency thereof, with correspondingly thin sections having reduced weight and reduced centrifugal loads that are carried by the supporting disk 58. The second blades 56, like the first blades 52 are characterized by the absence of any integral tip or mid-span shroud.

Accordingly, the individual fan blades 52,56 may be conventionally designed for maximum aerodynamic performance thereof while minimizing their weight and centrifugal loads carried by the corresponding disks 54,58.

The high pressure compressor 18 may correspondingly be conventionally configured for maximizing aerodynamic performance thereof in the typical multistage axial compressor configuration including several rows of stator vanes cooperating with corresponding rows of compressor rotor blades commonly joined to the third shaft 38 for being driven by the HPT 22.

The HPT 22 is a single stage turbine including a stator nozzle at the outlet end of the annular combustor 20, and a single row of turbine rotor blades extending radially outwardly from a supporting rotor disk, which is in turn fixedly joined to the third shaft 38 for driving the compressor.

The IPT 24 is also a single stage turbine having a corresponding stator nozzle cooperating with a single row of turbine rotor blades extending radially outwardly from a supporting rotor disk, which disk is in turn fixedly joined to the second shaft 36 for driving the second fan 36.

The LPT 26 typically includes multiple stages with corresponding stator nozzles and cooperating rows of turbine rotor blades extending radially outwardly from corresponding rotor disks, which disks are fixedly joined to the first shaft 34 for driving the upstream first fan 14.

The three concentric drive shafts or spools 34,36,38 are suitably mounted in several frames including a fan frame 60 at the forward end of the engine, and rear frame 62 at the aft end of the engine. The frames are annular and include corresponding structural hubs that suitably support various bearings for rotatably mounting the three shafts in the engine for concentric and independent rotation.

The annular fan frame 60 is disposed axially between the second fan 16 and the compressor 18, and includes a row of fan struts 64 extending radially outwardly from the central hub and through both the first and second bypass ducts 46,48 near the inlet ends thereof and directly aft of the OGVs 50. The rear frame 62 includes a corresponding row of struts which extend radially through the forward end of the exhaust duct 28 for supporting the aft ends of the drive shafts.

The exhaust duct 28 includes a main or first exhaust nozzle 66 joined in flow communication with both the core engine and the first bypass duct 46 for discharging the exhaust therefrom. The outlet end of the first bypass duct 46 is disposed in flow communication with the exhaust duct 28 that receives the fan bypass stream therefrom, which is then mixed with the combustion gases discharged from the third turbine 26.

The second bypass duct 48 is disposed at its outlet in flow communication with an auxiliary or second exhaust nozzle 68 which is preferably concentric with the first exhaust nozzle 66. The outer bypass stream of air channeled through the second bypass duct 48 may then be selectively discharged through the second nozzle 68 in a preferred embodiment for reducing exhaust noise during engine operation.

The first and second exhaust nozzles 66,68 may have any conventional configuration, and in one embodiment are conventionally configured for variable area operation. The two nozzles have corresponding actuators suitably joined to an engine controller 70, in the form of a digital computer, which suitably adjusts the discharge flow area thereof as required for efficient operation of the engine over its operating cycle and flight envelope of the aircraft.

In the exemplary embodiment illustrated in FIG. 1, the second exhaust nozzle 68 is disposed concentrically inside the first exhaust nozzle 66, and in alternate embodiments the second exhaust nozzle could be disposed outside the main nozzle 66.

For example, a conventional center cone or plug 72 may be coaxially disposed inside the aft end of the exhaust nozzle 28 to define the main exhaust nozzle 66. The plug 72 may be suitably axially translated inside the exhaust duct 28 when desired for changing the discharge flow area through the main nozzle 66.

In the typical converging-diverging supersonic exhaust nozzle, the plug 72 may diverge in the aft direction with a diameter increasing to a hump of maximum diameter to define a converging duct terminating at a throat of minimum flow area, typically designated A8, inside the exhaust duct 28. The plug then converges aft from the hump and decreases in diameter to define a diverging duct terminating at the main nozzle with a larger exit flow area, typically designated A9.

The auxiliary exhaust nozzle 68 may be suitably mounted inside the aft end of the main nozzle 66. Correspondingly, a row of hollow flow inversion struts 74 is disposed in flow communication between the outlet end of the second bypass duct 48 and the forward or inlet end of the exhaust plug 72.

The inversion struts 74 provide corresponding conduits to channel the outer bypass stream from the outer duct 48 radially inwardly through the aft end of the inner duct 46 and through the forward end of the exhaust duct 28 into the plug 72. The second exhaust nozzle 68 is suitably disposed inside the plug 72 in flow communication with the inversion struts 74 for selectively discharging the outer bypass stream from the exhaust plug when desired.

In this configuration of the second exhaust nozzle 68, an annular ring valve may be suitably mounted inside the plug for axial translation therein. The second nozzle 68 may be opened when desired for discharging the pressurized outer bypass stream into the main exhaust flow from the main nozzle 66 for reducing exhaust noise.

The second nozzle 68 is thusly configured as an acoustic nozzle for injecting pressurized fan air into the main exhaust for mixing therewith and reducing velocity thereof for attenuating noise. The second nozzle 68 may be suitably closed, partially or fully, when no longer required for noise attenuation or controlling performance of the engine.

Performance of the variable area nozzles 66,68 may be complemented by introducing a variable area bypass injector (VABI) 76 at the aft end of the first bypass duct 46. The VABI 76 may have any conventional configuration including flaps or ring valves for controlling discharge of the inner bypass stream from the inner bypass duct 46 into the common exhaust duct 28.

In this way, the engine controller 70 may control and coordinate operation of the variable exhaust nozzles 66,68 and VABI 76 to maximize performance and efficiency of the engine during its operating cycle, including the independent and simultaneous control of the operating lines of the first and second fans 14,16 as they pressurize airflow during operation. This includes the bypass ratio and stall margins associated with the double bypass fans.

Figure 2:
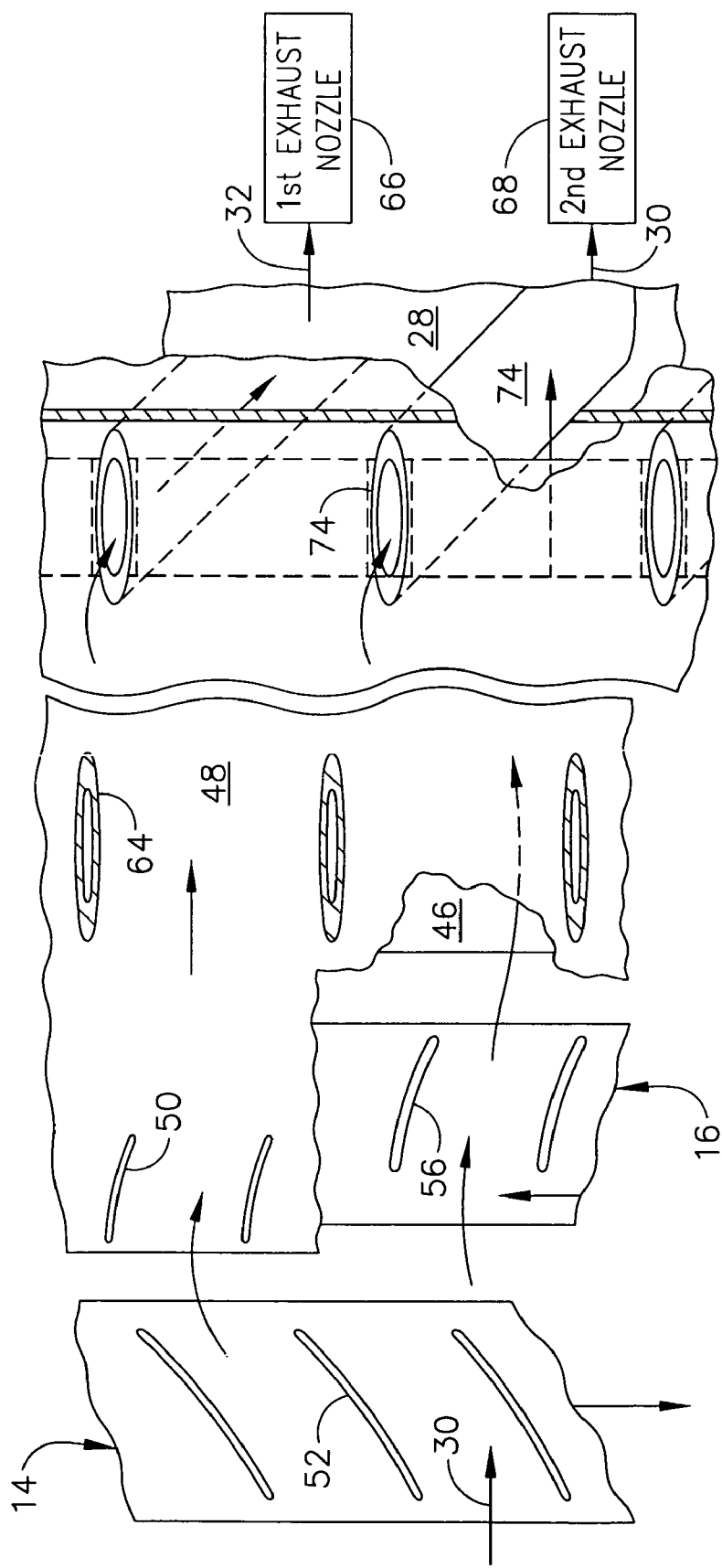
FIG. 2 is a planiform view of a portion of the engine illustrated in FIG. 1 and taken generally along line 2-2.

In the preferred embodiment illustrated in FIGS. 1 and 2, the first and second fans 14,16 have opposite airfoil configurations for their respective fan blades 52,56 for being driven in counter-rotation when powered by the third and second turbines 26,24, respectively. In particular, the corresponding generally concave pressure sides of the fan blades 52,56 face in circumferentially opposite directions for counter-rotation when driven by the rotor blades of the corresponding turbines 26,24, which also have circumferentially opposite airfoil configurations.

Counter rotation operation of the two stages of fan blades 52,56 improves aerodynamic performance and efficiency while eliminating extraneous stages and components. For example, the large single stage first fan 14 is directly followed in flow communication by the small single stage second fan 16 independently joined to their respective turbines 26,24 for counter-rotation.

The row of fan OGVs 50 is in direct flow communication with the radial outer tip ends of the first fan blades 52 for deswirling pressurized fan air into the outer bypass duct 48.

And, the OGVs 50 are directly followed by the outer portions of the fan struts 64 and the outer bypass duct 48, with the second fan blades 56 being directly followed by inner portions of the same struts in the inner bypass duct 46.

Accordingly, no inlet guide vanes (IGVs) are required between the two fans 14,16, and therefore permit a corresponding reduction in axial length of the engine, a reduction in weight, and a reduction in complexity, especially by eliminating the actuation system therefor.

Furthermore, corresponding OGVs may be eliminated between the second fan 16 and the fan struts 64 for further reducing engine length and weight while increasing performance.

The three-spool variable independent double bypass turbofan engine illustrated in FIG. 1 may be used to achieve the benefits associated with a FLADE variable cycle engine, without the mechanical complications and limitations thereof. Instead of using a FLADE shrouded fan blade, the engine illustrated in FIG. 1 includes a large or oversized first stage fan 14 without an integral FLADE therein. The first fan blades 52 may therefore be optimized for aerodynamic efficiency and strength, and may have relatively thin transverse sections, with centrifugal loads being carried by the supporting rotor disk 54.

The smaller second stage fan 56 is also configured without FLADES therein, and the second fan blades 56 are therefore optimized for aerodynamic efficiency and strength and have relatively thin transverse sections with centrifugal loads being efficiently carried by the supporting rotor disk 58.

The introduction of the double bypass ducts 46,48 cooperating with the two fan stages enjoys the benefits of the conventional FLADE design without the mechanical limitations. The large first stage fan blades 52 pressurize the incoming air 30, with the outer portion thereof being directly channeled through the OGVs 50 into the outer bypass duct 48. The inner portion of the pressurized air from the first fan 14 is directly coupled with the second stage fan 16.

The air is further pressurized in the second fan blades 56, with the radially outer portion thereof being channeled through the inner bypass duct 46, with the hub portion of the air from the second stage fan 16 being channeled into the inlet of the high pressure compressor 18.

Both tip airflow streams from the two fans 14,16 bypass the core engine through the double bypass ducts 46,48. The inner bypass stream from the inner duct 46 is independently discharged into the common exhaust duct 28. The outer bypass stream in the outer duct 48 is inverted through the aft struts 74 for selective discharge through the acoustic second nozzle 68 when desired for reducing engine noise.

The FLADE-less double bypass turbofan engine produces a relatively low pressure, low temperature outer bypass stream for use in feeding the inverted velocity profile acoustic nozzle 68, or for any other suitable purpose in variable cycle engines. For example, the low temperature outer bypass stream could be used for exhaust nozzle cooling or providing fluid shields around the exhaust stream.

Elimination of FLADES from the engine correspondingly removes aerodynamic penalties associated with the thicker airfoils of the FLADED design, flowpath constraints, interstage leakage, and tip speed constraints also associated with FLADE designs.

The FLADE-less two fan stages may therefore be optimized for airfoil design and higher fan efficiency, with a corresponding improvement in specific fuel consumption.

The counter-rotation configuration of the FLADE-less turbofan allows removal of several rows of stator airfoils in the fan stages, which correspondingly reduces length and weight of the engine. Counter-rotation may also be used to eliminate the turbine nozzle between the second turbine 24 and the third turbine 26 which operate in counter-rotation.

Furthermore, the large first fan 14 is exposed to its own throttle area or back pressure through the outer bypass duct 48 terminating in the acoustic nozzle 68 which correspondingly allows for independent control of the operating lines of the first and second stage fans 14,16. The inner bypass duct 46 is directly coupled to the second fan 16 and independently discharges its bypass stream through the first exhaust nozzle 66 in parallel flow with the second exhaust nozzle 68.

The independent control of the fan stages permits optimization of fan performance in flight using corresponding control of variable area in the two nozzles 66,68 when desired.

The combined benefits of the FLADE-less double bypass turbofan disclosed above has the potential to significantly increase range of the supersonic transport aircraft or business jet relative to conventional variable cycle engines, including FLADED designs. Preliminary engine cycle and aerodynamic analysis predicts a one percent improvement in specific fuel consumption of the double bypass turbofan engine disclosed above and a potential weight reduction of hundreds of pounds relative to a typical variable or adaptive cycle engine having a FLADE configuration.

Since variable cycle engines specifically configured for supersonic aircraft propulsion have various configurations, the double bypass, FLADE-less design disclosed above may be modified as desired to complement conventionally known variable cycle engines. Exhaust nozzles in variable cycle engines have a variety of configurations which can be used to advantage with the independent bypass streams from the outer and inner bypass ducts disclosed above directly coupled to the corresponding fan stages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A variable cycle turbofan engine comprising:
   a large single stage first fan directly followed in flow communication by a small single stage second fan independently joined to respective turbines;
   a first bypass duct surrounding a core engine including a compressor, a combustor, and a turbine joined to said compressor, and disposed in flow communication with said second fan;
   a second bypass duct surrounding said first bypass duct, and disposed in flow communication with said first fan;
   a first exhaust nozzle joined in flow communication with both said core engine and said first bypass duct; and
   a second exhaust nozzle joined in flow communication with said second bypass duct.

2. An engine according to claim 1 further comprising a row of outlet guide vanes disposed in an inlet end of said second bypass duct outboard of said second fan in direct flow communication with said first fan.

3. An engine according to claim 2 further comprising a fan frame disposed between said second fan and compressor, and including a row of struts extending radially outwardly through said first and second bypass ducts aft of said outlet guide vanes.

4. An engine according to claim 3 wherein said first and second fans have opposite airfoil configurations for counter-rotation when driven by said corresponding turbines.

5. An engine according to claim 4 further comprising:
a first casing surrounding said compressor;
a second casing spaced outboard from said first casing to define said first bypass duct;
a third casing spaced outboard from said second casing to define said second bypass duct;
said second fan extending radially outwardly across said first bypass duct to said second casing; and
said first fan extending radially outwardly across said second bypass duct to said third casing.

6. An engine according to claim 5 wherein:
said first fan is joined by a first spool to a third turbine;
said second fan is independently joined by a second spool to a second turbine forward of said third turbine;
said compressor is independently joined by a third spool to a first turbine forward of said second turbine; and
said first and second exhaust nozzles are disposed in independent flow communication with said first and second bypass ducts, respectively, for independently controlling operating lines of said first and second fans.

7. An engine according to claim 6 wherein said first and second exhaust nozzles are configured for variable area.

8. An engine according to claim 6 wherein said second exhaust nozzle is disposed concentrically inside said first exhaust nozzle.

9. An engine according to claim 6 further comprising:
a center plug disposed coaxially inside said first exhaust nozzle;
a row of flow inversion struts disposed in flow communication between said second bypass duct and said plug; and
said second exhaust nozzle is disposed inside said plug in flow communication with said inversion struts.

10. An engine according to claim 6 further comprising a variable area bypass injector disposed at the aft end of said first bypass duct to control bypass flow into said first exhaust nozzle.

11. A turbofan engine comprising:
a first fan, second fan, compressor, combustor, first turbine, second turbine, third turbine, and exhaust duct disposed in serial flow communication coaxially along an axial centerline axis;
said first fan being joined to said third turbine by a first drive shaft;
said second fan being joined to a second turbine by a second drive shaft;
said compressor being joined to said first turbine by a third drive shaft;
a first bypass duct surrounding said compressor in flow communication with said second fan;
a second bypass duct surrounding said second fan and said first bypass duct in flow communication with a radially outer tip of said first fan;
a first exhaust nozzle joined in flow communication with both said exhaust duct and said first bypass duct; and
a second exhaust nozzle being concentric with said first exhaust nozzle and joined in flow communication with said second bypass duct.

12. An engine according to claim 11 further comprising:
a first casing surrounding said compressor;
a second casing spaced outboard from said first casing to define said first bypass duct;
a third casing spaced outboard from said second casing to define said second bypass duct;
said second fan extending radially outwardly across said first bypass duct to said second casing; and
said first fan extending radially outwardly across said second bypass duct to said third casing.

13. A turbofan engine comprising:
a first fan, second fan, compressor, combustor, first turbine, second turbine, third turbine, and exhaust duct disposed in serial flow communication coaxially along an axial centerline axis;
said first fan being joined to said third turbine by a first drive shaft;
said second fan being joined to a second turbine by a second drive shaft;
said compressor being joined to said first turbine by a third drive shaft;
a first bypass duct surrounding said compressor in flow communication with said second fan;
a second bypass duct surrounding said second fan and said first bypass duct in flow communication with a radially outer tip of said first fan; and
a row of outlet guide vanes disposed in an inlet end of said second bypass duct outboard of said second fan.

14. An engine according to claim 13 wherein:
said exhaust duct includes a first exhaust nozzle for discharging exhaust from said third turbine;
said first bypass duct is disposed in flow communication with said exhaust duct; and
said second bypass duct is disposed in flow communication with a second exhaust nozzle being concentric with said first exhaust nozzle.

15. An engine according to claim 14 wherein:
said first fan comprises a single stage of first fan blades extending outwardly from a first disk; and
said second fan comprises a row of second fan blades extending outwardly from a second disk disposed axially between said first blades and said first bypass duct.

16. An engine according to claim 15 further comprising a fan frame disposed between said second fan and compressor, and including a row of struts extending radially outwardly through said first and second bypass ducts aft of said outlet guide vanes.

17. An engine according to claim 16 wherein said first and second fan blades have opposite airfoil configurations for counter-rotation when driven by said third and second turbines, respectively.

18. An engine according to claim 17 wherein said row of second fan blades is disposed in direct flow communication wit said row of first fan blades, and said row of outlet guide vanes is disposed in direct flow communication with the tip ends of said first fan blades.

19. An engine according to claim 16 wherein said first and second exhaust nozzles are configured for variable area.

20. An engine according to claim 16 wherein said second exhaust nozzle is disposed concentrically inside said first exhaust nozzle.

21. An engine according to claim 16 further comprising:
a center plug disposed coaxially inside said exhaust duct to define said first exhaust nozzle;
a row of flow inversion struts disposed in flow communication between said second bypass duct and said plug; and
said second exhaust nozzle is disposed inside said plug in flow communication with said inversion struts.

22. An engine according to claim 16 further comprising a variable area bypass injector disposed at the aft end of said first bypass duct to control bypass flow into said exhaust duct.

* * * * *

UNITED STATES PATENT AND TRADEMARK OFFICE
CERTIFICATE OF CORRECTION

PATENT NO. : 7,614,210 B2 Page 1 of 1
APPLICATION NO. : 11/352673
DATED : November 10, 2009
INVENTOR(S) : Powell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this

Nineteenth Day of October, 2010

David J. Kappos
*Director of the United States Patent and Trademark Office*